US011662003B2

(12) United States Patent
Yamada et al.

(10) Patent No.: US 11,662,003 B2
(45) Date of Patent: May 30, 2023

(54) BALL SCREW DEVICE

(71) Applicant: NSK Ltd., Tokyo (JP)

(72) Inventors: Kazuya Yamada, Kanagawa (JP); Yuji Shimomura, Kanagawa (JP); Yasuaki Abe, Kanagawa (JP); Kanta Sato, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/785,349

(22) PCT Filed: Mar. 12, 2021

(86) PCT No.: PCT/JP2021/009951
§ 371 (c)(1),
(2) Date: Jun. 14, 2022

(87) PCT Pub. No.: WO2021/210307
PCT Pub. Date: Oct. 21, 2021

(65) Prior Publication Data
US 2023/0015290 A1    Jan. 19, 2023

(30) Foreign Application Priority Data
Apr. 13, 2020   (JP) .............................. JP2020-071433

(51) Int. Cl.
*F16H 25/22*         (2006.01)
(52) U.S. Cl.
CPC ..... *F16H 25/2214* (2013.01); *F16H 25/2223* (2013.01)
(58) Field of Classification Search
CPC ...... F16H 25/2214; F16H 25/22; F16H 25/24; F16H 25/2223; F16H 25/2228
See application file for complete search history.

(56) References Cited

U.S. PATENT DOCUMENTS 7,631,572 B2 * 12/2009 Fujita .................. F16H 25/2223
                                                                 384/43
8,205,519 B2 *  6/2012 Osterlaenger ....... F16H 25/2214
                                                                 74/424.82
(Continued)

FOREIGN PATENT DOCUMENTS

EP      3763970 A1 *  1/2021  ............. B21D 28/32
JP      11-351350 A    12/1999
(Continued)

OTHER PUBLICATIONS

International Search Report for PCT/JP2021/009951 dated Apr. 6, 2021 [PCT/ISA/210].
(Continued)

*Primary Examiner* — Bobby Rushing, Jr.
(74) *Attorney, Agent, or Firm* — Sughrue Mion, PLLC

(57) ABSTRACT

A ball screw device has a screw shaft; a nut; a circulation part; and balls; a housing concave groove provided on the outer circumferential surface of the nut and linearly extending in the axial direction and opening to end surfaces on both outer sides in the axial direction of the nut, a circulation part arranged inside the housing concave groove, and the circulation part being prevented from displacing toward the outer side in the radial direction and displacing in the circumferential direction with respect to the nut by engaging an engaging convex portion of a fixing portion provided in the end portion on each of both outer sides in the axial direction of the circulation part with an engaging recess portion provided in the end portion of each of both outer sides in the axial direction of the housing concave groove.

7 Claims, 18 Drawing Sheets

(56) References Cited

U.S. PATENT DOCUMENTS

| | | | |
|---|---|---|---|
| 9,897,181 B1* | 2/2018 | Lin | F16H 25/2214 |
| 10,035,536 B2* | 7/2018 | Yamazaki | F16H 25/2214 |
| 10,507,865 B2* | 12/2019 | Asakura | F16H 7/023 |
| 10,663,042 B2* | 5/2020 | Sun | F16H 25/2219 |
| 2020/0385051 A1* | 12/2020 | Kato | B62D 5/0448 |

FOREIGN PATENT DOCUMENTS

| | | | | |
|---|---|---|---|---|
| JP | 2003113921 A | * | 4/2003 | F16H 25/2223 |
| JP | 2010-078060 A | | 4/2010 | |
| JP | 2010-112429 A | | 5/2010 | |
| JP | 2015081636 A | * | 4/2015 | |
| JP | 2015-132369 A | | 7/2015 | |
| JP | 2016223491 A | * | 12/2016 | F16H 25/22 |

OTHER PUBLICATIONS

Notice of Reasons for Refusal for JP 2021-531674 dated Aug. 5, 2021.

* cited by examiner

BALL SCREW DEVICE

CROSS REFERENCE TO RELATED APPLICATIONS

This application is a National Stage of International Application No. PCT/JP2021/009951 filed Mar. 12, 2021, claiming priority based on Japanese Patent Application No. 2020-071433 filed Apr. 13, 2020.

TECHNICAL FIELD

The present invention relates to a ball screw device.

BACKGROUND ART

A ball screw device is provided with balls which perform rolling motion between a screw shaft and a nut, and thus has a higher efficiency than a sliding screw device in which a screw shaft is in direct contact with a nut. Therefore, in order to convert rotating movement of a driving source such as an electric motor to linear motion, the ball screw device is assembled in various mechanical devices such as an electric braking device and an automatic manual transmission (AMT) of an automobile, a positioning device of a machine tool, and the like.

The ball screw device includes a screw shaft having a shaft-side ball thread groove having a spiral shape on the outer circumferential surface, a nut having a nut-side ball thread groove having a spiral shape on the inner circumferential surface, a plurality of balls that roll in a load passage (load ball rolling passage) constituted by the shaft-side ball thread groove and the nut-side ball thread groove, and a circulation part that is to return the balls from an end point to a starting point of the load passage. The circulation part has a circulation passage (non-load ball rolling passage) in the inner side, which connects the starting point and the end point of the load passage with each other.

The ball screw device is roughly classified into an external circulation type ball screw device represented by a return tube (pipe) type, and an internal circulation type ball screw device represented by a piece type. Among them, the external circulation type ball screw device has been widely used due to such reasons that, because a portion of the circulation passage is provided outside the nut, the balls having a large diameter can be easily used, and the balls can be smoothly circulated.

For example, JP H11-351350 A discloses an example of the external circulation type ball screw device. FIG. 18 illustrates a ball screw device 100 with a conventional structure as described in JP H11-351350 A.

The ball screw device 100 includes a screw shaft 101, a nut 102, a plurality of balls 103, and a circulation part 104. Note that, in the present specification, the axial direction, the radial direction, and the circumferential direction refer to the axial direction, the radial direction, and the circumferential direction in relation to the screw shaft, unless specified otherwise. In addition, with respect to the axial direction, the center side of the nut is referred to as the inner side in the axial direction, and both end sides of the nut are referred to as the outer sides in the axial direction.

The screw shaft 101 has a shaft-side ball thread groove 105 having a spiral shape on the outer circumferential surface. The nut 102 has a nut-side ball thread groove 106 having a spiral shape on the inner circumferential surface. The screw shaft 101 is inserted through the inside of the nut 102, and is arranged so as to be coaxial with the nut 102. The shaft-side ball thread groove 105 and the nut-side ball thread groove 106 are arranged so as to face each other in the radial direction, to constitute a load passage having a spiral shape.

The starting point and the end point of the load passage are connected to each other through a circulation passage 107 formed between the nut 102 and the circulation part 104. The balls 103 that have reached the end point of the load passage are returned to the starting point of the load passage through the circulation passage 107. Note that the starting point and the end point of the load passage are interchanged according to the direction of relative displacement in the axial direction (relatively rotating direction) of the screw shaft 101 and the nut 102.

The ball screw device 100 with a conventional structure has a seating surface portion 108 having a flat surface shape on one portion in the circumferential direction of the outer circumferential surface of the nut 102. The circulation part 104 is attached to the seating surface portion 108. A pair of through holes 109 opens to the seating surface portion 108 so as to be separated in the axial direction from each other. Each through hole 109 penetrates the nut 102 in the radial direction, and opens to the seating surface portion 108 and the inner circumferential surface of the nut 102.

The circulation part 104 has a body portion 110 having a partial columnar shape and bow-shaped end surfaces, and a pair of leg portions 111 integrally formed with the body portion 110.

The body portion 110 has a body-side concave groove 112 bent into an approximately S-shape on the inside surface in the radial direction which faces the seating surface portion 108. The circulation passage 107 is formed between the body-side concave groove 112 and the seating surface portion 108 having a flat surface shape. A portion of the inside surface in the radial direction of the body portion 110 that is deviated from the body-side concave groove 112 is seated on the seating surface portion 108.

The pair of leg portions 111 are inserted (press-fitted) into the insides of the pair of through holes 109 provided in the nut 102 without looseness. In this state, the tip-end portions of the pair of leg portions 111 are arranged inside the shaft-side ball thread groove 105. The respective leg portions 111 have functions to scoop up the balls 103 rolling in the load passage and introduce them into the circulation passage 107.

CITATION LIST

Patent Literature

[Patent Literature 1] JP H11-351350 A

SUMMARY OF INVENTION

Technical Problem

The ball screw device 100 with a conventional structure performs positioning of the circulation part 104 with respect to the nut 102 by inserting the pair of leg portions 111 of the circulation part 104 into the pair of through holes 109 of the nut 102. Therefore, in the ball screw device 100 with a conventional structure, it is necessary to form the pair of through holes 109 with high positional accuracy. For example, when any of the through holes 109 is formed at a position deviated from the normal position, a stress is applied to the circulation part 104, and thus there is a possibility that the circulation part 104 is deformed. As a result, there is a possibility that the inside of the circulation passage 107 is clogged with the balls 103, thereby preventing the balls 103 from smoothly circulating, and damaging the circulation part 104 early on.

Furthermore, in the ball screw device 100 with a conventional structure, the circulation part 104 is fixed to the nut 102 only by inserting (press-fitting) the pair of leg portions 111 into the pair of through holes 109. Due to this, a fixing force of the circulation part 104 to the nut 102 may possibly be insufficient, and thus there is a possibility to cause such problems that the circulation part 104 lifts up from the seating surface portion 108 by the force applied from the balls 103 to the circulation part 104.

An object of the present invention is to provide a ball screw device having a structure capable of relaxing positional accuracy of forming a through hole, and enhancing a fixing force of a circulation part to a nut.

Solution to Problem

A ball screw device of one aspect of the present invention includes a screw shaft, a nut, a circulation part, and a plurality of balls.

The screw shaft has a shaft-side ball thread groove having a spiral shape on an outer circumferential surface thereof.

The nut has a nut-side ball thread groove having a spiral shape on an inner circumferential surface thereof.

The shaft-side ball thread groove and the nut-side ball thread groove constitute a load passage having a spiral shape. The load passage has a starting point and an end point.

The circulation part is attached to an outer circumferential surface of the nut, so that a circulation passage that connects the starting point and the end point of the load passage is formed between the circulation part and the nut.

The plurality of balls are arranged in the load passage and the circulation passage so as to be able to roll.

In the ball screw device of one aspect of the present invention, the nut has a housing concave groove that is formed on the outer circumferential surface thereof, and that linearly extends in an axial direction so as to open to end surfaces on both outer sides in the axial direction thereof.

The housing concave groove includes a groove bottom surface having a flat surface shape, and a pair of groove wall surfaces that face each other in a circumferential direction.

The nut has a pair of through holes that distantly opens to the groove bottom surface, and that penetrate the nut in a radial direction.

The pair of groove wall surfaces has an engaging recess portion in an end portion on each of both outer sides in the axial direction.

The circulation part is arranged inside the housing concave groove, and has a pair of leg portions inserted into the pair of through holes, and a pair of fixing portions provided in end portions on both outer sides in the axial direction.

Each fixing portion of the pair of fixing portions has an engaging convex portion configured to engage with the engaging recess portion so that the circulation part is not able to displace toward an outer side in the radial direction and displace in the circumferential direction with respect to the nut.

In the ball screw device of one aspect of the present invention, the circulation part may be made of metal, and the engaging convex portion may be configured by a caulking portion that is to be pressed against the engaging recess portion due to plastic deformation.

When the circulation part is made of metal, the circulation part may be configured by an injection molded product made from a metal powder as raw material. In other words, the circulation part may be configured by a member manufactured by a metal powder injection molding method.

Alternatively, the circulation part may be made of a synthetic resin.

When the circulation part is made of a synthetic resin, the engaging convex portion may engage with the engaging recess portion by snap fit.

In the ball screw device of one aspect of the present invention, the engaging recess portion may open to the end surface on the outer side in the axial direction of the nut.

In the ball screw device of one aspect of the present invention, the pair of fixing portions may be arranged at positions deviated from the pair of leg portions toward the outer sides in the axial direction.

In the ball screw device of one aspect of the present invention, the fixing portion may have a pair of side plate portions that are arranged so as to face the pair of groove wall surfaces, each of the pair of side plate portions including the engaging convex portion.

In this case, the fixing portion may have a base plate portion that is disposed on the groove bottom surface, end portions on both sides in the circumferential direction of the base plate portion being connected to end portions on an inner side in the radial direction of the pair of side plate portions.

In the ball screw device of one aspect of the present invention, the circulation part may be arranged inside the housing concave groove so as not to project from the housing concave groove toward the outer side in the radial direction.

In the ball screw device of one aspect of the present invention, the circulation part may have a rotationally symmetrical shape around a center portion in the axial direction (in a length direction of the circulation part).

Effect of Invention

According to one aspect of the present invention, a structure of a ball screw device capable of relaxing positional accuracy of forming a through hole, and enhancing a fixing force of a circulation part to a nut can be achieved.

DESCRIPTION OF EMBODIMENTS

FIRST EXAMPLE

Figure 1:
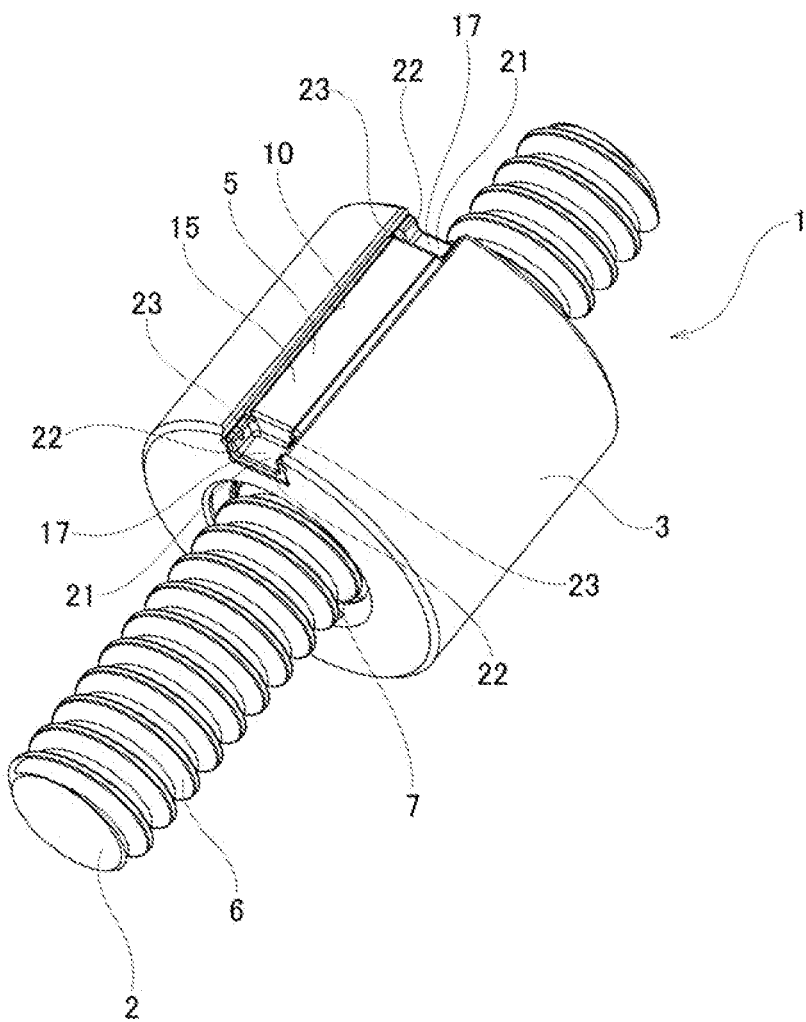
FIG. 1 is a perspective view of a ball screw device of a first example of an embodiment of the present invention.
Figure 2:
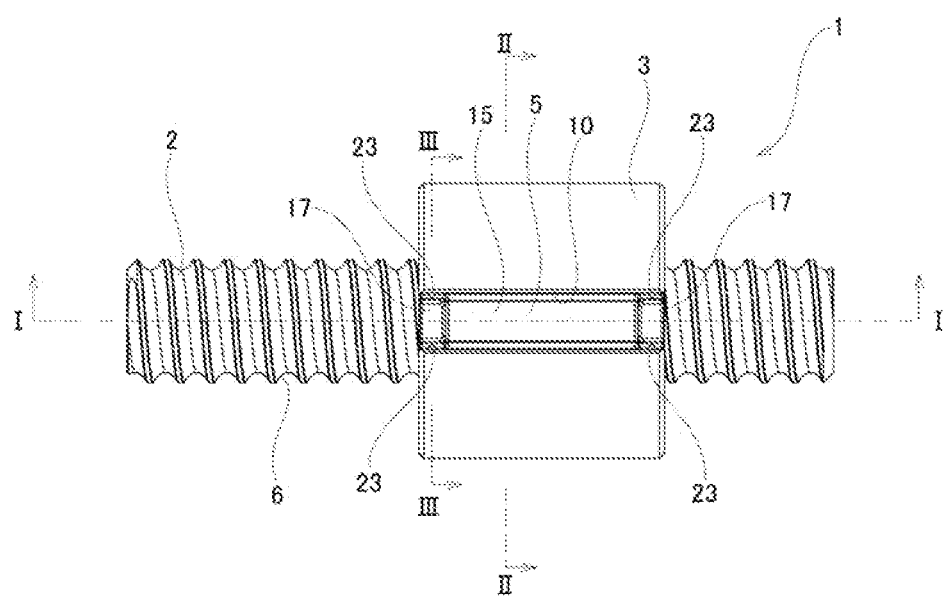
FIG. 2 is a plan view of the ball screw device of the first example.

A first example of an embodiment of the present invention will be described using FIGS. 1 to 13.

Entire Configuration of Ball Screw Device

A ball screw device 1 of this example is an external circulation type ball screw device for automobile, and is used, for example, in such applications as being assembled in an electric brake booster device so as to convert rotating movement of an electric motor, which is a driving source, to linear motion to operate a piston of a hydraulic cylinder.

The ball screw device 1 includes a screw shaft 2, a nut 3, a plurality of balls 4, and a circulation part 5.

The screw shaft 2 is inserted through the inside of the nut 3, and is arranged so as to be coaxial with the nut 3. A load passage 8 having a spiral shape is provided between the outer circumferential surface of the screw shaft 2 and the inner circumferential surface of the nut 3. The plurality of balls 4 are arranged in the load passage 8 so as to be able to roll. When the screw shaft 2 and the nut 3 are relatively rotated, the balls 4 having reached an end point of the load passage 8 are returned to a starting point of the load passage 8 through a circulation passage 9 formed between the nut 3 and the circulation part 5. The ball screw device 1 is used, for example, in a manner that the screw shaft 2 is linearly moved with respect to the nut 3 by relatively rotating the nut 3 with respect to the screw shaft 2. The structure of each component of the ball screw device 1 will be described below.

Screw Shaft

The screw shaft 2 is made of metal, and has a shaft-side ball thread groove 6 having a spiral shape with a constant lead on the outer circumferential surface. The shaft-side ball thread groove 6 is formed on the outer circumferential surface of the screw shaft 2 by performing a grinding process, a cutting process, or a roll forming process. The number of threads of the shaft-side ball thread groove 6 is, for example, a single. The groove shape (groove bottom shape) of the cross section of the shaft-side ball thread groove 6 is a gothic arch groove shape or a circular arc groove shape.

Nut

The nut 3 is made of metal, and is configured in an approximately cylindrical shape as a whole. The nut 3 has a nut-side ball thread groove 7 having a spiral shape in the inner circumferential surface. The nut-side ball thread groove 7 is formed on the inner circumferential surface of the nut 3 by performing a grinding process, a cutting process, a roll form tapping process, or a cut tapping process, and has the same lead as the shaft-side ball thread groove 6. Due to this, the shaft-side ball thread groove 6 and the nut-side ball thread groove 7 are arranged so as to face each other in the radial direction in a state where the screw shaft 2 is inserted through the inside of the nut 3, to constitute the load passage 8 having a spiral shape. The number of threads of the nut-side ball thread groove 7 is, for example, a single, as similar to the shaft-side ball thread groove 6. The groove shape (groove bottom shape) of the cross section of the nut-side ball thread groove 7 is also a gothic arch groove shape or a circular arc groove shape, as similar to the shaft-side ball thread groove 6.

Figure 6:
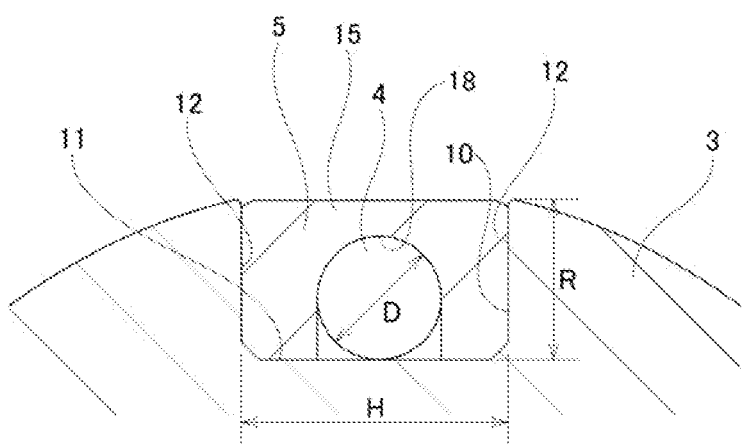
FIG. 6 is a partially enlarged view of FIG. 5.
Figure 7:
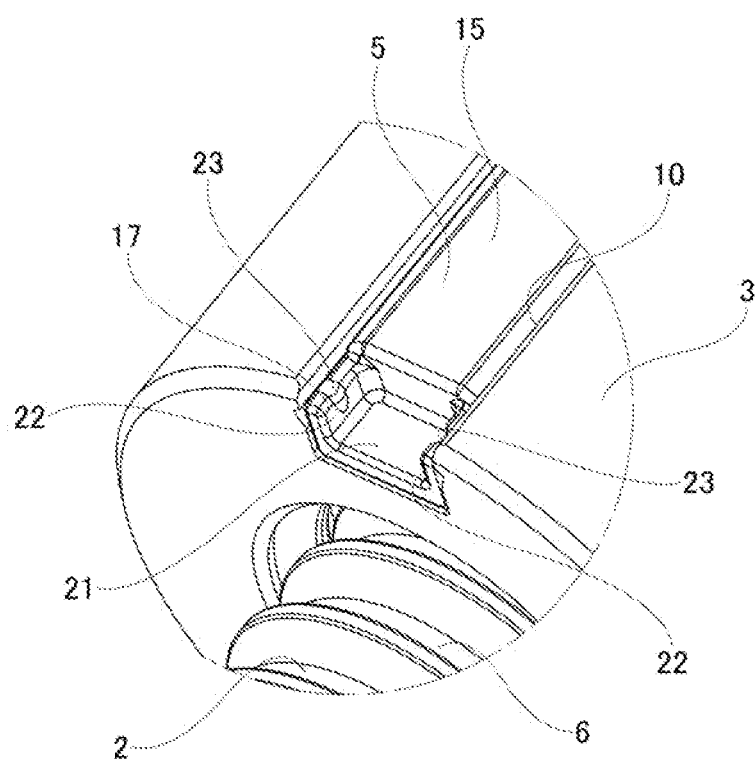
FIG. 7 is a partially enlarged view of FIG. 1.

The nut 3 has a housing concave groove 10 on one portion in the circumferential direction of the outer circumferential surface. The housing concave groove 10 linearly extends in the axial direction, which is a direction along a center axis $O_2$ of the screw shaft 2. In other words, the housing concave groove 10 extends in a direction orthogonal to end surfaces on both outer sides in the axial direction of the nut 3. In addition, the housing concave groove 10 opens to both of the end surfaces on both outer sides in the axial direction of the nut 3. The depth dimension R in the radial direction and the width dimension H in the circumferential direction of the housing concave groove 10 are constant over the entire length in the axial direction. In this example, as illustrated in FIG. 6, the depth dimension R in the radial direction of the housing concave groove 10 is smaller than the width dimension H in the circumferential direction of the housing concave groove 10. The depth dimension R of the housing concave groove 10 is about 1.0 to 1.2 times as large as the diameter D of the balls 4, and the width dimension H of the housing concave groove 10 is about 1.4 to 3.0 times as large as the diameter D of the balls 4.

The housing concave groove 10 has an approximately rectangular (oblong) cross-sectional shape, and has a groove bottom surface 11 having a flat surface shape, and a pair of groove wall surfaces 12 having a flat surface shape. The groove bottom surface 11 is arranged in parallel to the center axis $O_2$ of the screw shaft 2. The pair of groove wall surfaces 12 are arranged at approximately right angles to the groove bottom surface 11. The respective groove wall surfaces 12 are arranged in parallel to each other, and face each other in the circumferential direction. In this example, the housing concave groove 10 is formed by a cutting process using a cutting tool such as an end mill. As described above, because the housing concave groove 10 has an approximately rectangular cross-sectional shape, and linearly extends in the axial direction, and thus does not have a complicated shape, the housing concave groove 10 can be easily processed with high accuracy by a cutting process.

Figure 9:
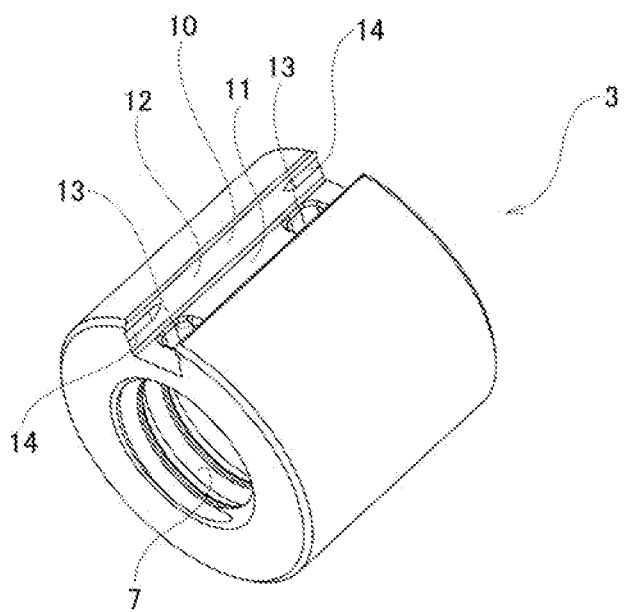
FIG. 9 is a perspective view of a nut of the ball screw device of the first example.

As illustrated in FIG. 9, a pair of through holes 13 open to the groove bottom surface 11 so as to be separated in the axial direction from each other. Each through hole 13 of the pair of through holes 13 penetrates the nut 3 in the radial direction, and opens to not only the groove bottom surface 11 but also the inner circumferential surface of the nut 3. Specifically, the pair of through holes 13 open to the nut-side ball thread groove 7 formed on the inner circumferential surface of the nut 3. Furthermore, each through hole 13 is configured by a long hole (rectangular hole) that extends along the nut-side ball thread groove 7. A pair of leg portions 16 (described later) provided in the circulation part 5 are inserted in the pair of through holes 13.

Figure 10:
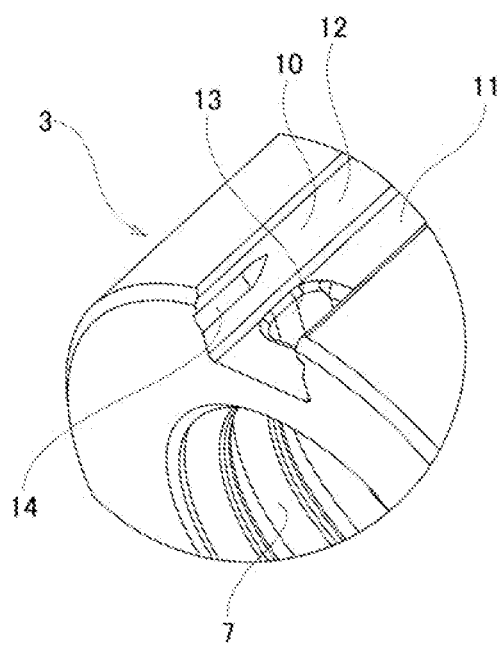
FIG. 10 is a partially enlarged view of FIG. 9.

As illustrated in FIGS. 9 and 10, in this example, each groove wall surface 12 of the pair of groove wall surfaces 12 has engaging recess portions 14 in the end portions on both outer sides in the axial direction. That is, a pair of the engaging recess portions 14 are provided in each of the end portions on both outer sides in the axial direction of the housing concave groove 10. Each engaging recess portion 14 of the pair of engaging recess portions 14 has an approximately triangular cross-sectional shape, and is arranged from the intermediate portion in the radial direction to a portion near the outer side in the radial direction of the groove wall surface 12. Therefore, the engaging recess portion 14 does not open to the outer circumferential surface of the nut 3. However, the engaging recess portion 14 opens to the end surface on the outer side in the axial direction of the nut 3. Furthermore, as illustrated in FIG. 10, the inner side portion (innermost portion) in the axial direction of the engaging recess portion 14 has a triangular pyramid shape, and the depth in the circumferential direction and the width in the radial direction of the engaging recess portion 14 become smaller, respectively, as going toward the inner side in the axial direction. Due to this, in the inner side portion in the axial direction of the pair of engaging recess portions 14, the interval in the circumferential direction between the groove bottom portions (vertexes of triangular cross-sectional shapes) of the pair of engaging recess portions 14 that face each other in the circumferential direction becomes narrower as going toward the inner side in the axial direction.

Figure 11:
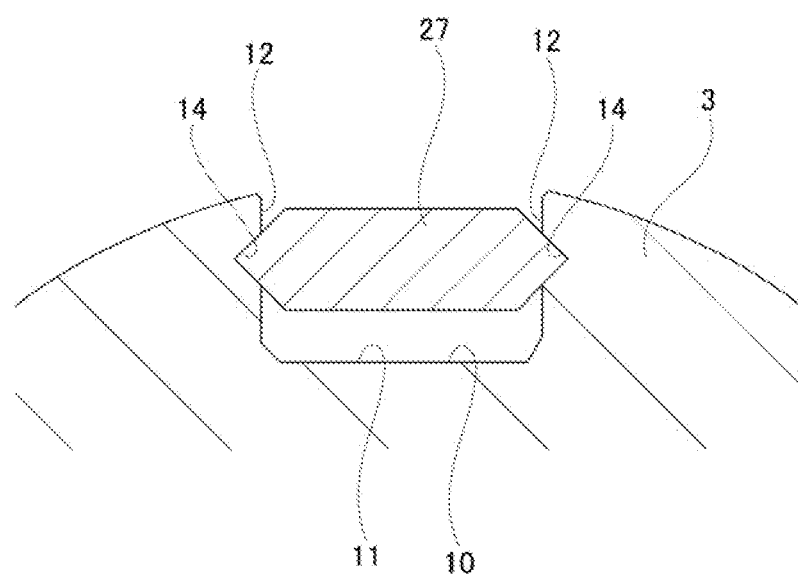
FIG. 11 is a schematic view for describing a process of forming engaging recess portions on a pair of groove wall surfaces of a housing concave groove with respect to the ball screw device of the first example.

In the illustrated example, the end portion on the inner side in the axial direction of the engaging recess portion 14 is located at substantially the same position in the axial direction as the end portion on the inner side in the axial direction of the opening portion of the through hole 13. However, when embodying the present invention, the end portion on the inner side in the axial direction of the engaging recess portion 14 may be positioned further outward in the axial direction than the illustrated position, and also may be positioned further inward in the axial direction than the illustrated position. Alternatively, recess grooves constituting the engaging recess portions 14 provided on the end portions on both outer sides in the axial direction of each groove wall surface 12 may be coupled to each other in the axial direction. In other words, a recess groove may be formed over the entire length of each groove wall surface 12 so that the engaging recess portions 14 are constituted by the respective portions on both outer sides in the axial direction of the recess groove. As illustrated in FIG. 11, the pair of engaging recess portions 14 provided on each of the end portions on the outer sides in the axial direction of the housing concave groove 10 may be simultaneously formed on the pair of groove wall surfaces 12, for example, by moving a cutting tool 27 having a rhombic cross-sectional shape (abacus-bead-like cross-sectional shape) from the opening portion side in the axial direction toward the inner side in the axial direction of the housing concave groove 10.

Ball

The balls 4 are steel balls having a predetermined diameter, and are arranged in the load passage 8 and the circulation passage 9 so as to be able to roll. The ball 4 arranged in the load passage 8 rolls with a compression load applied, and on the other hand, the ball 4 arranged in the circulation passage 9 is pushed by the following ball 4 and rolls without a compression load applied.

Circulation Part

The circulation part 5 is an injection molded product made from a metal powder as raw material, which is manufactured by a metal powder injection molding method (MIM), and is arranged inside the housing concave groove 10 of the nut 3. As the metal powder (MIM alloy) for constituting the circulation part 5, for example, Fe—Ni—C (1 to 8% Ni, to 0.8% C), Fe—Cr—C (0.5 to 2% Cr, 0.4 to 0.8% C), SCM415, SUS630 and the like may be used.

Figure 12:
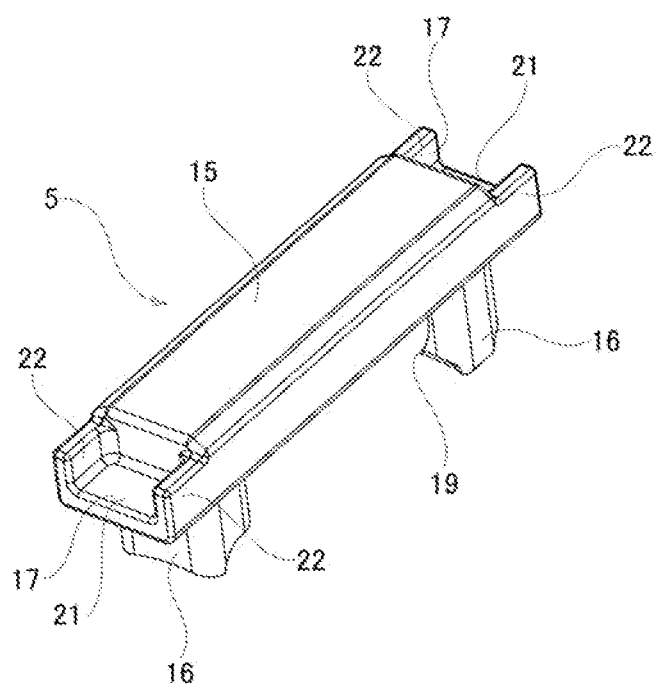
FIG. 12 is a perspective view of a circulation part before forming engaging convex portions with respect to the ball screw device of the first example, as viewed from the outer side in the radial direction.
Figure 13:
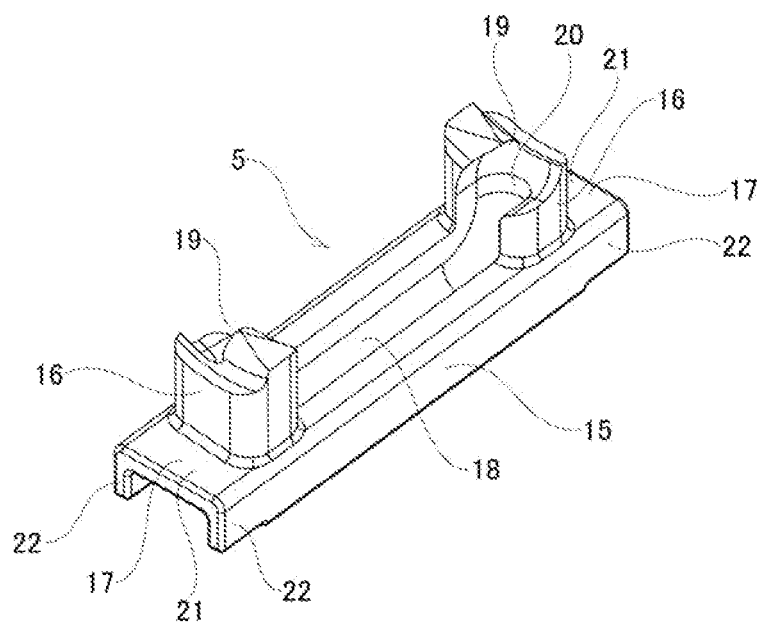
FIG. 13 is a perspective view of a circulation part before forming engaging convex portions with respect to the ball screw device of the first example, as viewed from the inner side in the radial direction.
Figure 14:
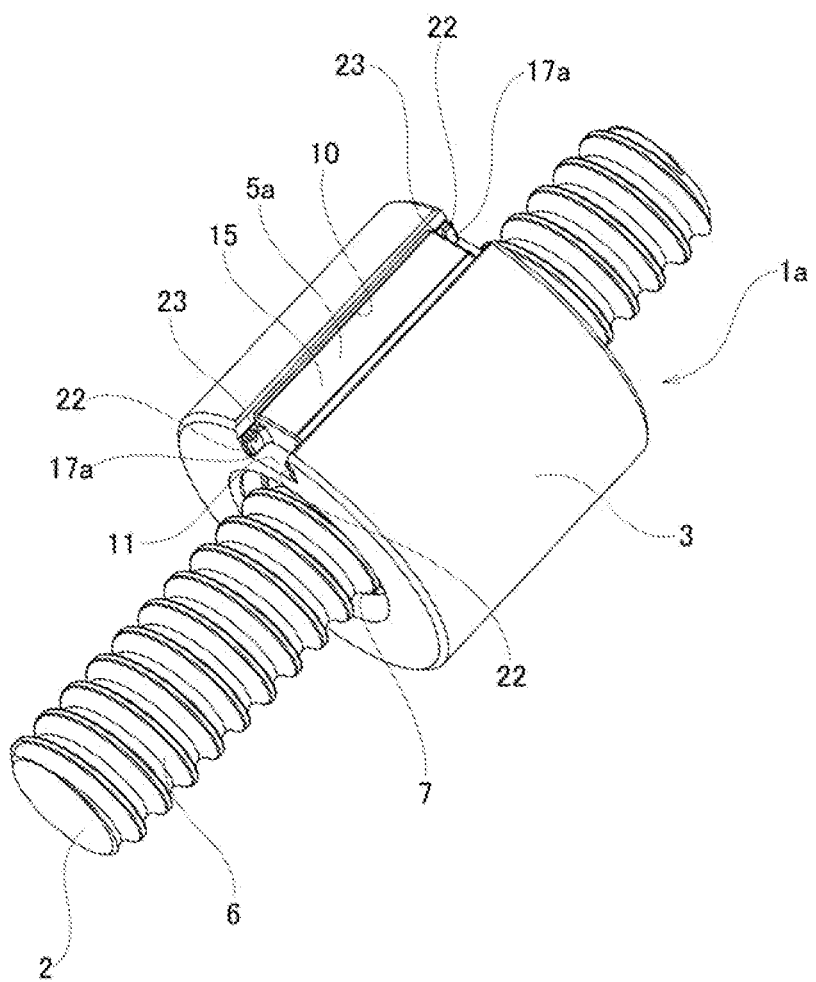
FIG. 14 is a perspective view of a ball screw device of a second example of an embodiment of the present invention.
Figure 15:
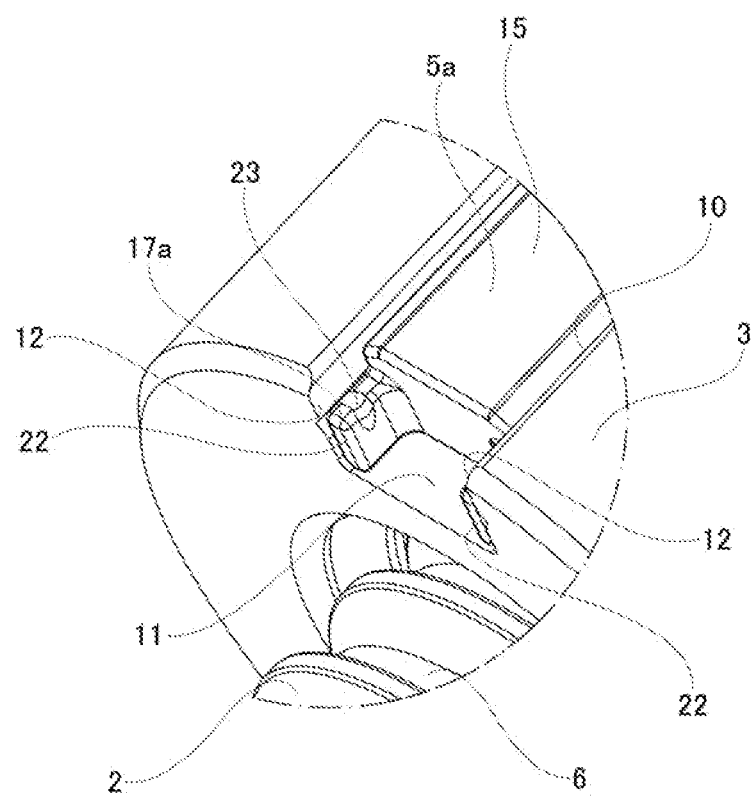
FIG. 15 is a partially enlarged view of FIG. 14.
Figure 16:
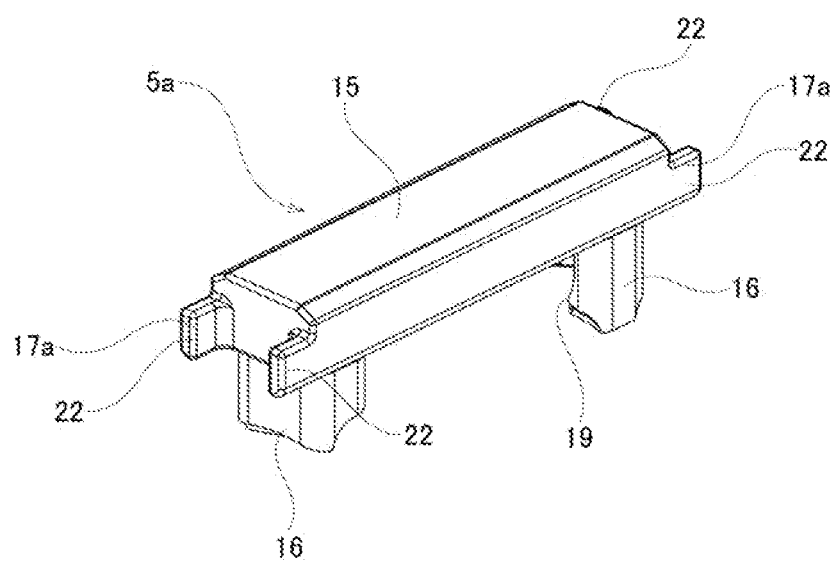
FIG. 16 is a view of the ball screw device of the second example, which corresponds to FIG. 12.
Figure 17:
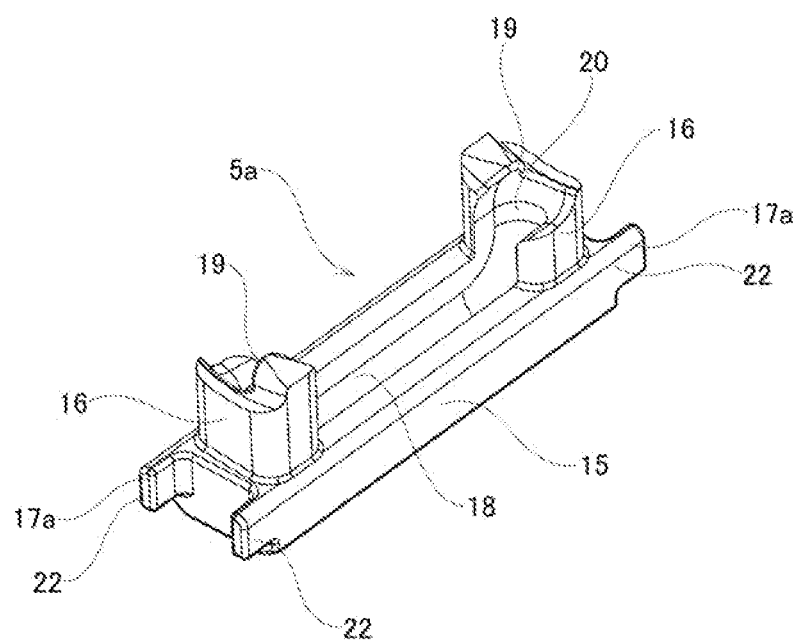
FIG. 17 is a view of the ball screw device of the second example, which corresponds to FIG. 13.
Figure 18:
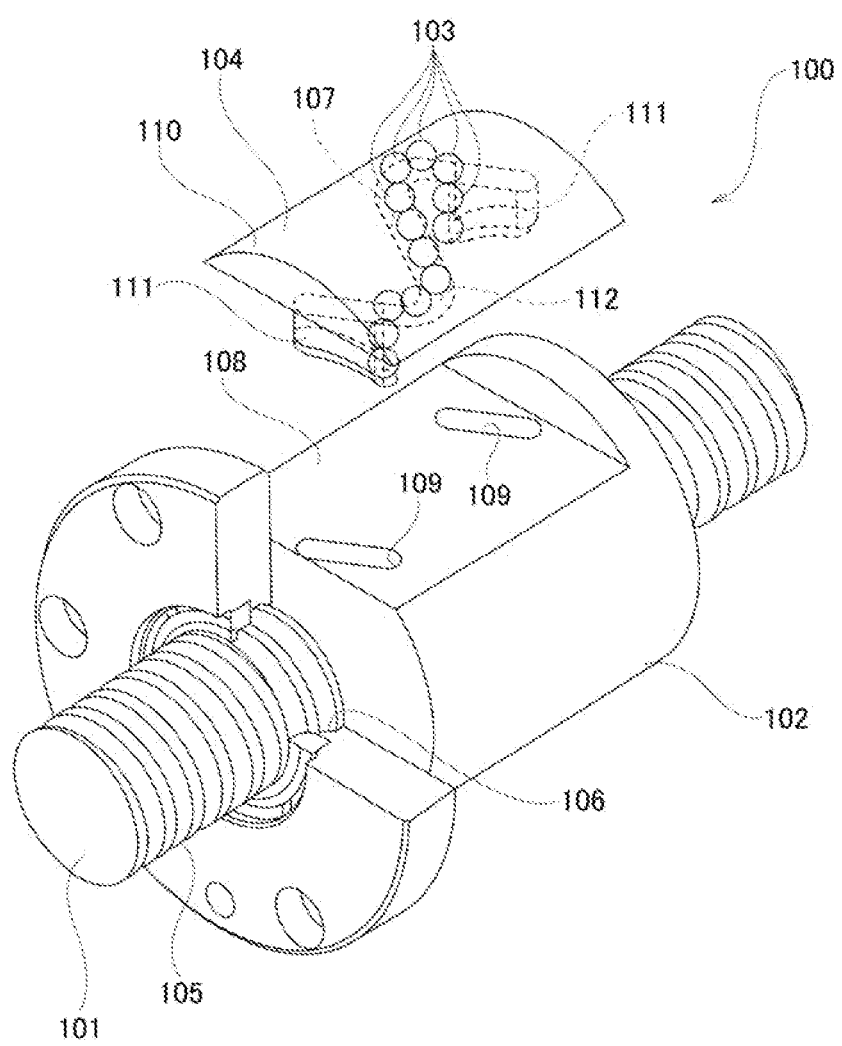
FIG. 18 is an exploded perspective view of a ball screw device with a conventional structure.

As illustrated in FIGS. 12 and 13, the circulation part 5 has a body portion 15, a pair of leg portions 16, and a pair of fixing portions 17. The circulation part 5 has a rotationally symmetrical shape around the center portion in the length direction (in the axial direction).

The body portion 15 is configured in an elongated plate shape, and is arranged inside the housing concave groove 10 of the nut 3, with the length direction coincident with the axial direction, through a gap (minute gap) so as not to apply a load to the body portion 15. Therefore, with the circulation part 5 arranged inside the housing concave groove 10, both side surfaces in the circumferential direction of the body portion 15 face the pair of groove wall surfaces 12 through a gap. The body portion 15 has a slightly smaller width dimension than the width dimension H in the circumferential direction of the housing concave groove 10. Note that, when embodying the present invention, positioning in the circumferential direction of the circulation part with respect to the nut may be performed by arranging (fitting) the body portion inside the housing concave groove without looseness in the circumferential direction.

The body portion 15 has a body-side concave groove 18 linearly extending in the axial direction on the inside surface in the radial direction (lower surface) facing the groove bottom surface 11. A portion of the circulation passage 9 (return passage 24 described later) is formed between the body-side concave groove 18 and the intermediate portion in the axial direction of the groove bottom surface 11 (flat surface portion between the opening portions of the pair of through holes 13). As illustrated in FIG. 6, the groove shape of the cross section of the body-side concave groove 18 is a semi-oval shape. The body-side concave groove 18 has a slightly larger groove width than the diameter D of the balls 4, and has a slightly larger groove depth than the diameter D of the balls 4. The groove depth of the body-side concave groove 18 from the inside surface in the radial direction of the body portion 15 does not vary in the axial direction in the intermediate portion in the axial direction of the body-side concave groove 18, but becomes smaller in a curved line as going toward the outer side in the axial direction in the end portions on both outer sides in the axial direction thereof A portion of the inside surface in the radial direction of the body portion 15 that is deviated from the body-side concave groove 18 in the circumferential direction is seated on the groove bottom surface 11. In this example, positioning in the radial direction of the circulation part 5 with respect to the nut 3 is performed by arranging the body portion 15 inside the housing concave groove 10, and bring the portion of the inside surface in the radial direction of the body portion 15 into contact with the groove bottom surface 11.

The outside surface in the radial direction (upper surface) of the body portion 15 is configured in a flat surface shape that is approximately parallel to the groove bottom surface 11 so as not to project from the outer circumferential surface of the nut 3 toward the outer side in the radial direction. However, the outside surface in the radial direction of the body portion 15 may be configured in a partial cylindrical surface shape that has substantially the same radius of curvature as that of the outer circumferential surface of the nut 3.

Each leg portion 16 of the pair of leg portions 16 is configured in an approximately semi-cylindrical shape. The pair of leg portions 16 extend from the inside surfaces in the radial direction of the end portions on both outer sides in the axial direction of the body portion 15 toward the inner side in the radial direction. Each leg portion 16 is inserted into the inner side of each through hole 13 formed in the nut 3 from the outer side in the radial direction. In this example, the leg portion 16 is inserted into the inner side of the through hole 13 through a gap (minute gap) so as not to apply a load to the leg portion 16. The tip-end portion (end portion on the inner side in the radial direction) of the leg portion 16 has a scoop-up portion 19 having a tongue piece shape so as to scoop up the balls 4 rolling in the load passage 8 and introduce them into the circulation passage 9. The scoop-up portion 19 is arranged inside the shaft-side ball thread groove 6. The leg portion 16 is provided with a leg-portion-side concave groove 20 that is smoothly connected to the end portion on the outer side in the axial direction of the body-side concave groove 18 provided in the body portion 15. The leg-portion-side concave groove 20 opens to a portion of the inner circumferential surface of the through hole 13 that faces toward the outer side in the axial direction.

Figure 3:
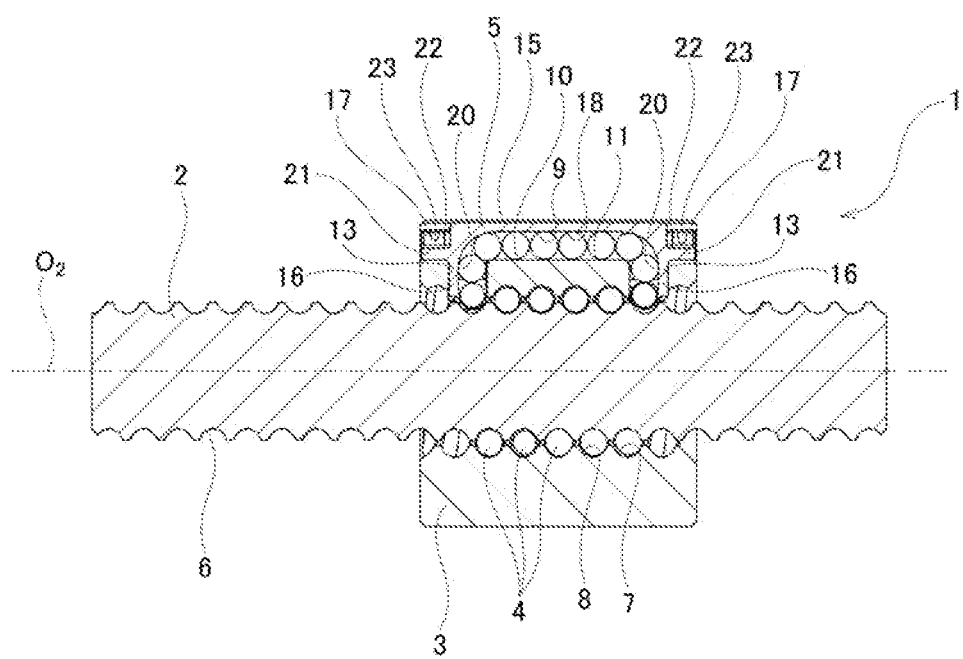
FIG. 3 is a cross-sectional view taken along line I-I of FIG. 2.
Figure 4:
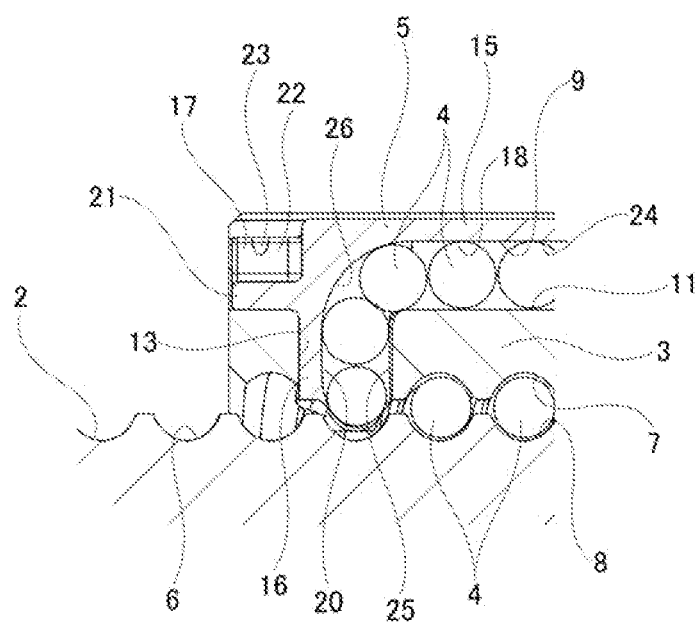
FIG. 4 is a partially enlarged view of FIG. 3.
Figure 5:
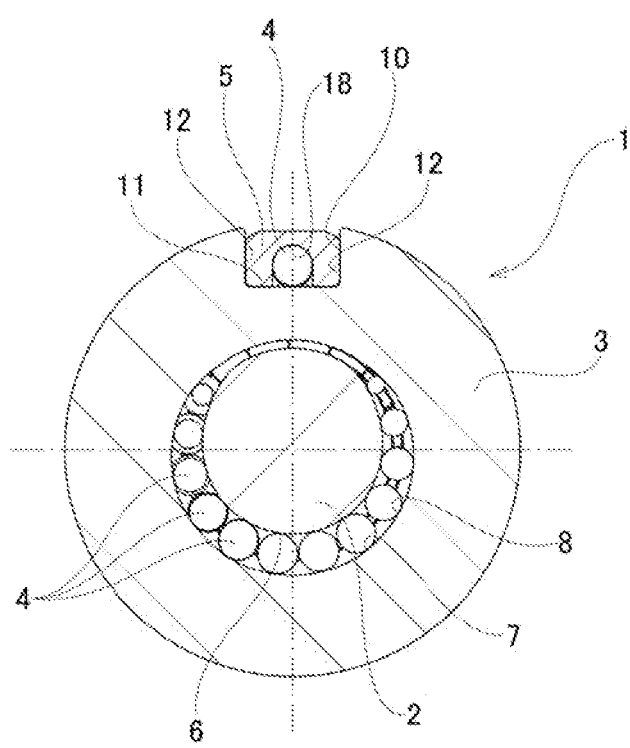
FIG. 5 is a cross-sectional view taken along line II-II of FIG. 2.

In this example, each fixing portion 17 of the pair of fixing portions 17 has an approximately U-shaped cross-sectional shape. The pair of fixing portions 17 are arranged on both outer sides in the axial direction of the body portion 15. In other words, as illustrated in FIGS. 3 and 4, the pair of fixing portions 17 are arranged in end portions on both outer sides in the axial direction of the circulation part 5 that are deviated from the pair of leg portions 16 toward the outer sides in the axial direction. Each fixing portion 17 has a base plate portion 21 having a thin flat plate shape, and a pair of side plate portions 22.

Figure 8:
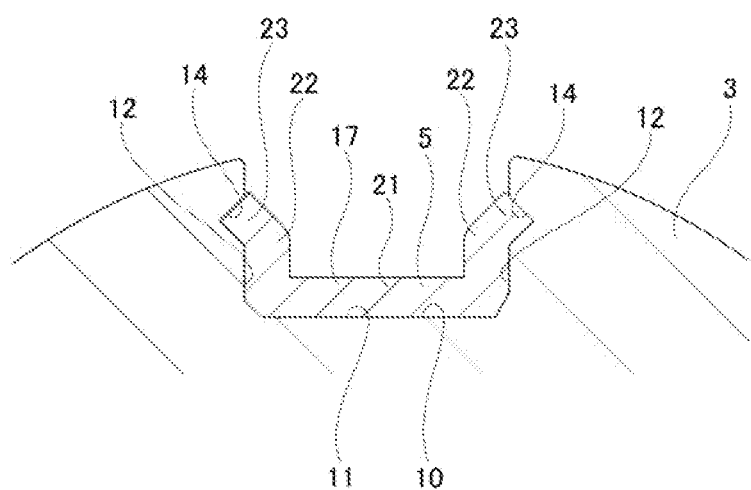
FIG. 8 is a schematic cross-sectional view taken along line III-III of FIG. 2.

The base plate portion 21 is disposed on the groove bottom surface 11 without any gap. The pair of side plate portions 22 are arranged on both sides in the circumferential direction (in the width direction) of the base plate portion 21, and are bent approximately at right angles with respect to the base plate portion 21 toward the outer side in the radial direction. In other words, the pair of side plate portions 22 are arranged so as to face (overlap) the pair of groove wall surfaces 12. In addition, the end portions on both sides in the circumferential direction of the base plate portion 21 are connected to the end portions on the inner side in the radial direction of the pair of side plate portions 22, respectively. In a state before a pair of engaging convex portions 23 (described later) are formed, as illustrated in FIGS. 12 and 13, the pair of side plate portions 22 are configured in a thin flat plate shape, respectively, and have the same width dimension as that of the body portion 15. On the other hand, in a state where the circulation part 5 is fixed to the nut 3, as illustrated in FIG. 8, the pair of side plate portions 22 include a pair of engaging convex portions 23 configured by caulking portions that are pressed against the respective engaging recess portions 14 due to plastic deformation.

The pair of engaging convex portions 23 are formed, in a state where the circulation part 5 is arranged inside the housing concave groove 10, by arranging a punch (not illustrated) on the outer side in the radial direction of the fixing portion 17, and then moving the punch toward the inner side in the radial direction of the fixing portion 17, so as to plastically deform the outside portions in the radial direction of the pair of side plate portions 22 with respect to the circumferential direction (in the plate thickness direction). In other words, the outside portions in the radial direction of the pair of side plate portions 22 are pressed and widened in the circumferential direction by the punch, so as to simultaneously form the respective engaging convex portions 23. The pair of engaging convex portions 23 enter the inner sides of the pair of engaging recess portions 14 provided on the groove wall surfaces 12, and are pressed against the pair of engaging recess portions 14. Due to this, the pair of engaging convex portions 23 engage with the pair of engaging recess portions 14 so as not able to displace toward the outer side in the radial direction. Specifically, the end portion in the circumferential direction of each engaging convex portion 23 engages with the end portion on the outer side in the radial direction of each engaging recess portion 14, thereby preventing the pair of engaging convex portions 23 from displacing toward the outer side in the radial direction with respect to the pair of engaging recess portions 14. In this example, the pair of engaging convex portions 23 engage with the pair of engaging recess portions 14 in each of the fixing portions 17 provided in the end portions on both outer sides in the axial direction of the circulation part 5, so that the pair of fixing portions 17 are caulked and fixed to the nut 3 so as not to be able to fall off (displace) toward the outer side in the radial direction. In addition, due to this, positioning in the radial direction of the circulation part 5 with respect to the nut 3 is performed. Furthermore, because the pair of engaging convex portions 23 are pressed against the pair of engaging recess portions 14 in each of the fixing portions 17, the circulation part 5 is not able to displace in the circumferential direction with respect to the nut 3, and also positioning in the circumferential direction of the circulation part 5 with respect to the nut 3 is performed.

In this example, only the intermediate portion in the axial direction of the outside portion in the radial direction of each side plate portion 22 is plastically deformed in the circumferential direction to form the engaging convex portion 23 on the portion. Furthermore, by forming the engaging convex portion 23 in the outside portion in the radial direction of each side plate portion 22, a portion of the side plate portion 22 that is deviated from the engaging convex portion 23 is pressed against the groove wall surface 12 of the housing concave groove 10.

In this example, in a state where the circulation part 5 is attached to the nut 3, the circulation passage 9 is formed at a portion between the circulation part 5 and the nut 3. In other words, the circulation passage 9 is not configured only by the circulation part 5, but is configured by the circulation part 5 and the nut 3. Specifically, the circulation passage 9 is configured by a space having a semi-oval cross-sectional shape which is formed between the body-side concave groove 18 and the groove bottom surface 11 of the housing concave groove 10, and a space having an approximately circular cross-sectional shape which is formed between the leg-portion-side concave groove 20 and the inner circumferential surface of the through hole 13. The circulation passage 9 is connected to the starting point and the end point of the load passage 8. The starting point and the end point of the load passage 8 are, in other words, a connecting point (boundary) between the load passage 8 and the circulation passage 9, or a scoop-up point of the scoop-up portion 19. Note that the starting point and the end point of the load passage 8 are interchanged according to the change of the moving direction of the ball 4 as the direction of relative displacement (relatively rotating direction) with respect to the axial direction of the screw shaft 2 and the nut 3 changes.

In this example, the circulation passage 9 includes a passage by which interference with the load passage 8 can be avoided, and has a return passage 24, a pair of scoop-up passages 25, and a pair of connecting passages 26. More specifically, the circulation passage 9 is configured by the scoop-up passage 25, the connecting passage 26, the return passage 24, the connecting passage 26, and the scoop-up passage 25, which are arranged in this order from the end point to the starting point of the load passage 8. In other words, the scoop-up passage 25 is connected to the load passage 8 and the connecting passage 26, the connecting passage 26 is connected to the scoop-up passage 25 and the return passage 24, and the return passage 24 is connected to the respective connecting passages 26.

The return passage 24 has a role of returning the balls 4 to the side of the starting point of the load passage 8 with respect to the axial direction. The return passage 24 is configured by the intermediate portion in the axial direction of the body-side concave groove 18 and the flat surface portion of the groove bottom surface 11 between the opening portions of the pair of through holes 13. The return passage 24 is arranged on the outer side in the radial direction of the load passage 8 (outside the nut 3). The return passage 24 has a center line linearly extending in the axial direction and in parallel to the center axis $O_2$ of the screw shaft 2. Due to this, in this example, the number of turns of the load passage 8 can be made closer to an integer by making the phases in the circumferential direction of the starting point and the end point of the load passage 8 closer to each other, preferably by making the phases in the circumferential direction of the starting point and the end point coincide with each other.

The scoop-up passage 25 has roles of scooping up the balls 4 at the end point of the load passage 8, and supplying the balls 4 to the starting point of the load passage 8. The scoop-up passage 25 is configured by the inner side portion in the radial direction of the leg-portion-side concave groove 20 and the inner side portion in the radial direction of the inner circumferential surface of the through hole 13. The center line of the scoop-up passage 25 is curved in a circular arc shape as viewed in the axial direction.

The connecting passage 26 has a role of connecting the scoop-up passage 25 and the return passage 24. The connecting passage 26 is configured by the outside portion in the radial direction of the leg-portion-side concave groove 20 and the outside portion in the radial direction of the inner circumferential surface of the through hole 13, and the end portion on the outer side in the axial direction of the body-side concave groove 18 and the inner side portion in the axial direction of the opening edge portion of the through hole 13 that opens to the groove bottom surface 11. At least part of the center line of the connecting passage 26 is curved in a circular arc shape as viewed in the circumferential direction.

The ball screw device 1 of this example is able to relax positional accuracy of forming the pair of through holes 13, and enhance a fixing force of the circulation part 5 to the nut 3.

That is, in this example, by engaging the pair of engaging convex portions 23 with the pair of engaging recess portions 14 in each of the fixing portions 17 provided in the end portions on both outer sides in the axial direction of the circulation part 5, the circulation part 5 is not able to displace toward the outer side in the radial direction and displace in the circumferential direction with respect to the nut 3, and positioning in the radial direction and the circumferential direction of the circulation part 5 with respect to the nut 3 is performed. Due to this, in the ball screw device 1 of this example, it is not necessary to perform positioning of the circulation part 5 with respect to the nut 3 by inserting the pair of leg portions 16 of the circulation part 5 into the pair of through holes 13 provided in the nut 3, unlike the ball screw device with a conventional structure. Thus, the positional accuracy of forming each through hole 13 of the pair of through holes 13 can be relaxed. As a result, even when any of the through holes 13 is formed at a position deviated from the normal position, deformation of the circulation part 5 can be suppressed. Therefore, it is possible to prevent the circulation passage 9 from being clogged with the balls 4 in the inner side due to deformation of the circulation part 5, and thus the balls 4 can be smoothly circulated. In addition, the working cost of the through holes 13 can be reduced.

In this example, because portions of the pair of side plate portions 22 that are deviated from the pair of engaging convex portions 23 are pressed against the pair of groove wall surfaces 12, displacement in the circumferential direction of the circulation part 5 with respect to the nut 3 can be effectively suppressed.

In this example, the interval in the circumferential direction between the groove bottom portions of the pair of engaging recess portions 14 that are provided in the housing concave groove 10 and face each other in the circumferential direction becomes narrower as going toward the inner side in the axial direction in the inner side portion in the axial direction of the pair of engaging recess portions 14. Due to this, the pair of engaging convex portions 23 engaging with the pair of engaging recess portions 14 are restricted from displacing toward the inner side in the axial direction. Therefore, displacement in the axial direction of the circulation part 5 to the nut 3 can be suppressed as well.

In this example, the pair of engaging convex portions 23 engage with the pair of engaging recess portions 14 in each of the fixing portions 17 provided in the end portions on both outer sides in the axial direction of the circulation part 5, so that the fixing portions 17 are caulked and fixed to the nut 3 so as not to be able to fall off toward the outer side in the radial direction. Due to this, in this example, a fixing force of the circulation part 5 to the nut 3 can be sufficiently enhanced as compared to cases where a fixing force is obtained only by inserting (press-fitting) leg portions into through holes like a conventional structure. Therefore, the circulation part 5 can be effectively prevented from slipping off (lifting up) from the housing concave groove 10 toward the outer side in the radial direction. In addition, because any fixing members such as a screw are not required to fix the circulation part 5 to the nut 3, the number of parts can be prevented from increasing, and the manufacture cost can be reduced.

In this example, because the fixing portions 17 are arranged at positions deviated in the axial direction from the leg portions 16, a force applied from the punch to the pair of side plate portions 22 of each fixing portion 17 can be restricted from being transmitted to the respective leg portions 16. Due to this, the leg portions 16 can be prevented from deforming when the pair of engaging convex portions 23 are formed in the pair of side plate portions 22. In addition, because the pair of engaging convex portions 23 are formed in the outside portions in the radial direction of the pair of side plate portions 22, the large amount of projection (protrusion) in the circumferential direction of the pair of engaging convex portions 23 can be secured. Furthermore, because only the intermediate portions in the axial direction of the outside portions in the radial direction of the pair of side plate portions 22 are plastically deformed in the circumferential direction to form the pair of engaging convex portions 23 in the portions, the nut 3 can be prevented from being applied with a large force as the pair of engaging convex portions 23 are formed, thereby suppressing deformation of the nut 3.

In this example, because, when the pair of engaging convex portions 23 are formed in the pair of side plate portions 22, the punch (not illustrated) is moved toward the inner side in the radial direction while the base plate portion 21 is disposed on the groove bottom surface 11, the groove bottom surface 11 can be used as a receiving surface. Due to this, a force from the punch can be effectively transmitted to the pair of side plate portions 22, thereby sufficiently plastically deforming the respective side plate portions 22. Therefore, the engaging convex portions 23 can be firmly pressed against the engaging recess portions 14 so as to engage with the engaging recess portions 14.

In this example, because the whole of the circulation part 5 is arranged inside the housing concave groove 10, the rigidity of the nut 3 can be suppressed from decreasing as the housing concave groove 10 is formed on the outer circumferential surface of the nut 3. In addition, because the circulation part 5 is arranged inside the housing concave groove 10 so as not to project from the housing concave groove 10 toward the outer side in the radial direction, the ball screw device 1 can be suppressed from increasing in size.

In this example, because the circulation part 5 has a rotationally symmetrical shape around the center portion in the axial direction, restriction of the assembling direction of the circulation part 5 can be relaxed. Due to this, the assembly man-hour can be reduced, which is advantageous in reducing the assembly cost.

Note that, in this example, the pair of engaging recess portions 14 are provided in the end portion on each of both outer sides in the axial direction of the pair of groove wall surfaces 12, the pair of engaging convex portions 23 are provided in each of the pair of fixing portions 17, and the pair of engaging convex portions 23 engage with the pair of engaging recess portions 14 in the end portion on each of both outer sides in the axial direction of the housing concave groove 10. However, as long as it is possible to prevent the circulation part from displacing toward the outer side in the radial direction and displacing in the circumferential direction with respect to the nut due to engagement of the engaging recess portion and the engaging convex portion, the present invention is not limited to this illustrated example. For example, it is also possible that one engaging recess portion 14 is provided in the end portion on each of both outer sides in the axial direction of the pair of groove wall surfaces 12, one engaging convex portion 23 is provided in each of the pair of fixing portions 17, and the engaging convex portion 23 engages with the engaging recess portion 14 in the end portion on each of both outer sides in the axial direction of the housing concave groove 10. More specifically, it is also possible that one engaging recess portion is provided in the end portion on one side in the axial direction of one groove wall surface, one engaging recess portion is provided in the end portion on the other side in the axial direction of the other groove wall surface, one engaging convex portion is formed only in a portion of the side plate portion on the side of the one groove wall surface of the pair of side plate portions of the fixing portion arranged on the one side in the axial direction, which corresponds to the engaging recess portion on the one side in the axial direction, and one engaging convex portion is formed only in a portion of the side plate portion on the side of the other groove wall surface of the pair of side plate portions of the fixing portion arranged on the other side in the axial direction, which corresponds to the engaging recess portion on the other side in the axial direction. Such a configuration is also included in the scope of the present invention.

SECOND EXAMPLE

A second example of an embodiment of the present invention will be described using FIGS. 14 to 17.

In the ball screw device 1a of this example, the configuration of the pair of fixing portions 17a of the circulation part 5a is modified from the structure of the first example. Specifically, each fixing portion 17a of the pair of fixing portions 17a is configured only by the pair of side plate portions 22 arranged so as to face (overlap) the pair of groove wall surfaces 12 of the housing concave groove 10. In other words, each fixing portion 17a does not include a base plate portion which is to be disposed on the groove bottom surface 11 of the housing concave groove 10.

In the ball screw device 1a of this example, because the pair of side plate portions 22 are able to be strongly pressed against the pair of groove wall surfaces 12, displacement in the circumferential direction of the circulation part 5a with respect to the nut 3 can be more effectively suppressed. Furthermore, because two base plate portions are omitted as compared to the structure of the first example, the circulation part 5a can be reduced in weight. Other configurations and operational effects are the same as in the first example.

When embodying the present invention, the structures of the respective examples of the above embodiments can be appropriately combined as long as no contradiction arises.

When embodying the present invention, the pair of groove wall surfaces of the housing concave groove are not limited to being parallel to each other, and, for example, may be inclined so as to separate in the circumferential direction from each other as going toward the outer side in the radial direction. When adopting such a configuration, the housing concave groove has a trapezoidal cross-sectional shape.

When embodying the present invention, the circulation part may be made of a synthetic resin. In this case, as a synthetic resin, for example, a fiber-reinforced polyamide resin material prepared by appropriately adding glass fibers into a polyamide 66 resin may be used. In addition, as required, the polyamide resin may be appropriately added with an amorphous aromatic polyamide resin (modified polyamide 6T/6I), and a low water-absorbing aliphatic polyamide resin (a polyamide 11 resin, a polyamide 12 resin, a polyamide 610 resin, a polyamide 612 resin), to further enhance a water resistance. When the circulation part is made of a synthetic resin, the engaging convex portions of the fixing portion are able to engage with the engaging recess portions of the housing concave groove of the nut by snap fitting.

| Reference Signs List | |
| --- | --- |
| 1, 1a | Ball screw device |
| 2 | Screw shaft |
| 3 | Nut |
| 4 | Ball |
| 5, 5a | Circulation part |
| 6 | Shaft-side ball thread groove |

| Reference Signs List | |
|---|---|
| 7 | Nut-side ball thread groove |
| 8 | Load passage |
| 9 | Circulation passage |
| 10 | Housing concave groove |
| 11 | Groove bottom surface |
| 12 | Groove wall surface |
| 13 | Through hole |
| 14 | Engaging recess portion |
| 15 | Body portion |
| 16 | Leg portion |
| 17, 17a | Fixing portion |
| 18 | Body-side concave groove |
| 19 | Scoop-up portion |
| 20 | Leg-portion-side concave groove |
| 21 | Base plate portion |
| 22 | Side plate portion |
| 23 | Engaging convex portion |
| 24 | Return passage |
| 25 | Scoop-up passage |
| 26 | Connecting passage |
| 27 | Cutting tool |
| 100 | Ball screw device |
| 101 | Screw shaft |
| 102 | Nut |
| 103 | Ball |
| 104 | Circulation part |
| 105 | Shaft-side ball thread groove |
| 106 | Nut-side ball thread groove |
| 107 | Circulation passage |
| 108 | Seating surface portion |
| 109 | Through hole |
| 110 | Body portion |
| 111 | Leg portion |
| 112 | Body-side concave groove |

The invention claimed is:

1. A ball screw device comprising:
a screw shaft having a shaft-side ball thread groove with a spiral shape on an outer circumferential surface thereof;
a nut having a nut-side ball thread groove with a spiral shape on an inner circumferential surface thereof, the shaft-side ball thread groove and the nut-side ball thread groove constituting a load passage having a spiral shape;
a circulation part attached to an outer circumferential surface of the nut, the circulation part forming a circulation passage connecting a starting point and an end point of the load passage between the circulation part and the nut; and
a plurality of balls arranged in the load passage and the circulation passage so as to be able to roll;
wherein
the nut has:
a housing concave groove formed on the outer circumferential surface thereof, the housing concave groove linearly extending in an axial direction so as to open to end surfaces on both outer sides in the axial direction thereof, and the housing concave groove including a groove bottom surface having a flat surface shape and a pair of groove wall surfaces facing each other in a circumferential direction thereof, and
a pair of through holes distantly positioned in the groove bottom surface and
opening thereto and penetrating the nut in a radial direction thereof;
the pair of groove wall surfaces has an engaging recess portion in an end portion on each of both outer sides in the axial direction;
the circulation part is arranged inside the housing concave groove, and has a pair of leg portions inserted into the pair of through holes, and a pair of fixing portions provided in end portions on both outer sides in the axial direction; and
each fixing portion of the pair of fixing portions has a pair of side plate portions that are arranged so as to face the pair of groove wall surfaces, each of the pair of side plate portions including an engaging convex portion configured to engage with the engaging recess portion so that the circulation part is not able to displace toward an outer side in the radial direction and displace in the circumferential direction with respect to the nut.

2. The ball screw device according to claim 1, wherein the circulation part is made of metal, and the engaging convex portion is configured by a caulking portion that is to be pressed against the engaging recess portion due to plastic deformation.

3. The ball screw device according to claim 1, wherein the engaging recess portion opens to the end surface on the outer side in the axial direction of the nut.

4. The ball screw device according to claim 1, wherein the pair of fixing portions are arranged at positions deviated from the pair of leg portions toward the outer sides in the axial direction.

5. The ball screw device according to claim 1, wherein the fixing portion has a base plate portion that is disposed on the groove bottom surface, end portions on both sides in the circumferential direction of the base plate portion being connected to end portions on an inner side in the radial direction of the pair of side plate portions.

6. The ball screw device according to claim 1, wherein the circulation part is arranged inside the housing concave groove so as not to project from the housing concave groove toward the outer side in the radial direction.

7. The ball screw device according to claim 1, wherein the circulation part has a rotationally symmetrical shape around a center portion in the axial direction.

* * * * *